(12) United States Patent
Korsgaard et al.

(10) Patent No.: US 11,885,293 B2
(45) Date of Patent: Jan. 30, 2024

(54) EXTENDABLE WIND TURBINE BLADE

(71) Applicant: LM Wind Power A/S, Kolding (DK)

(72) Inventors: John Korsgaard, Kolding (DK); Jelmer Cnossen, Eastleigh (GB)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 17/717,676

(22) Filed: Apr. 11, 2022

(65) Prior Publication Data

US 2022/0325693 A1 Oct. 13, 2022

(30) Foreign Application Priority Data

Apr. 12, 2021 (EP) .................................... 21167853

(51) Int. Cl.
*F03D 1/06* (2006.01)
(52) U.S. Cl.
CPC ......... *F03D 1/0633* (2013.01); *F03D 1/0675* (2013.01); *F05B 2240/302* (2013.01)
(58) Field of Classification Search
CPC .... F03D 1/0633; F03D 1/0641; F03D 1/0675; F03D 1/0683; F05B 2240/302
See application file for complete search history.

(56) References Cited

U.S. PATENT DOCUMENTS

| | | | | |
|---|---|---|---|---|
| 4,710,101 A * | 12/1987 | Jamieson | ............... | F03D 7/0252 416/169 R |
| 6,726,439 B2 | 4/2004 | Mikhail et al. | | |
| 6,972,498 B2 * | 12/2005 | Jamieson | ............... | F03D 7/0236 290/55 |
| 7,581,926 B1 * | 9/2009 | Dehlsen | ............... | F03D 7/0236 416/37 |
| 8,152,466 B2 * | 4/2012 | Gandhi | ............... | B64C 27/46 416/88 |

(Continued)

FOREIGN PATENT DOCUMENTS

| | | |
|---|---|---|
| CN | 202056007 U | 11/2011 |
| DE | 3126677 A1 | 1/1983 |

(Continued)

OTHER PUBLICATIONS

European Search Report Corresponding to EP21167853 dated Oct. 1, 2021.

*Primary Examiner* — Courtney D Heinle
*Assistant Examiner* — Sang K Kim
(74) *Attorney, Agent, or Firm* — Dority & Manning, P.A.

(57) ABSTRACT

An extendable wind turbine blade for being extended in length during operation thereof, the wind turbine blade having an exterior surface with a root region and an airfoil region and comprising a first blade segment including a first portion of the exterior surface, a second blade segment including a second portion of the exterior surface, and a connection mechanism connecting the blade segments, and being configured to bring the wind turbine blade to a retracted state, in which the portions of the exterior surface are flush and adjoining, when the wind turbine blade operates above a threshold rotational speed and to bring the wind turbine blade to an extended state, in which the portions of the exterior surface are disconnected and the blade length is at least 101% of the blade length in the retracted state, when the wind turbine blade operates below the threshold rotational speed.

14 Claims, 7 Drawing Sheets

(56) References Cited

U.S. PATENT DOCUMENTS

| | | | |
|---|---|---|---|
| 8,231,347 B2* | 7/2012 | Dawson | F03D 1/0675 |
| | | | 416/211 |
| 8,485,782 B2* | 7/2013 | Turmanidze | B64C 27/46 |
| | | | 416/88 |
| 10,626,846 B2 | 4/2020 | Herrig et al. | |
| 2003/0123973 A1* | 7/2003 | Murakami | F03D 1/0675 |
| | | | 416/223 R |
| 2009/0304507 A1 | 12/2009 | Dehlsen | |
| 2013/0236307 A1 | 9/2013 | Stege | |
| 2019/0107101 A1* | 4/2019 | Hotto | F03D 7/024 |

FOREIGN PATENT DOCUMENTS

| | | |
|---|---|---|
| DE | 4428731 A1 | 2/1996 |
| EP | 2636890 A1 | 9/2013 |
| JP | S5732074 A | 2/1982 |
| WO | WO2010086472 A1 | 8/2010 |

\* cited by examiner

EXTENDABLE WIND TURBINE BLADE

TECHNICAL FIELD

The present disclosure relates to an extendable wind turbine blade.

BACKGROUND

Modern variable-speed wind turbines generally use fixed length blades rotating about a hub and generally operate in four different wind regimes: a first regime below a cut-in speed of the wind turbine, a second regime between the cut-in speed and a rated speed, a third regime between the rated speed and a cut-out speed, and a fourth regime above the cut-out speed. Typically, no energy is produced in the first and fourth regimes where the wind speeds are respectively too low and too high for energy production. In the third regime, loads are reduced on the wind turbine typically by either stall or pitch regulating the blades, i.e. by selectively rotating the blades about their longitudinal axes, in order to change the blade angle respect to relative wind velocity.

The energy production of wind turbines is governed by the swept area of the wind turbine blades. Accordingly, the rotor of wind turbines and hence wind turbine blade length have over the years increased in size as the available wind energy for conversion is proportional to the swept area of the rotor and hence proportional to the blade length squared.

In order to increase production at low wind speeds, a telescoping wind turbine blade has been proposed. However, such a telescoping blade design suffers from a number of disadvantages. The manufacture of such a blade is complex as the telescoping portion of the blade has to be accommodated in a base portion of the blade. Further, such a telescoping blade duplicates the shell surface which increases the weight in the tip region of the blade.

SUMMARY

On this background, it may be seen as an object of the present disclosure to provide a wind turbine blade for a wind turbine with increased capability for energy capture between a cut-in speed and rated speed of the wind turbine. Another object of the present disclosure is to provide a low cost and/or a simple construction of such a wind turbine blade.

One or more of these objects may be met by aspects of the present disclosure as described in the following.

A first aspect of this disclosure relates to an extendable wind turbine blade for being extended in length during operation, e.g. between a cut-in speed and a rated speed, thereof, the wind turbine blade extending along a longitudinal axis from a root end to a tip end, the wind turbine blade having an exterior surface, e.g. being in contact with airflow over the wind turbine blade, with a root region and an airfoil region, the wind turbine blade having a chord line extending between a leading edge and a trailing edge, the wind turbine blade comprising a first blade segment, a second blade segment, and a connection mechanism. The first blade segment includes a first portion of the exterior surface, a first end, and preferably the root end. The second blade segment includes a second portion of the exterior surface, a second end facing the first end, and the tip end, the second blade segment being separate from the first blade segment. The connection mechanism connects the first blade segment with the second blade segment in a retracted state and in an extended state, and is configured to bring the wind turbine blade to the retracted state when the wind turbine blade operates above a threshold and to bring the wind turbine blade to the extended state when the wind turbine blade operates below the threshold. In the retracted state, the wind turbine blade has a first length from the root end to tip end and the first portion of the exterior surface is arranged substantially flush with and adjoining the second portion of the exterior surface. In the extended state, the wind turbine blade has a second length from the root end to tip end and the second blade segment is arranged with a gap to the first blade segment so that the first portion of the exterior surface and the second portion of the exterior surface are substantially disconnected. The second length is at least 101% of the first length. Preferably, the second length is at least 102%, 103%, 104%, or 105% of the first length.

Such an extendable blade may have advantages in manufacturing, as a whole wind turbine blade can be manufactured, then be divided, e.g. by cutting, into the first and second blade segments, and subsequently have the connection mechanism fitted. This may be an easier way to manufacture an extendable blade compared to prior art telescopic blades which require complex shaping to allow a telescopic elongation.

In general, the threshold can be based on a number of parameters, such as a rotational speed threshold, a power threshold, a wind speed threshold, a load threshold, a noise threshold, and a force or acceleration threshold. In general, the threshold is to be met to change between the extended state and the retracted state. Thus, if the rotational speed of the wind turbine blade exceeds the threshold, the blade may be brought to the retracted state. Similarly, the wind turbine blade may be brought to the retracted state, if the power of the wind turbine meets or exceeds a power threshold. Also, the wind turbine blade may be brought to the retracted state, if a measure wind speed meets (e.g., exceeds a wind speed threshold). This can be carried out in combination with wind speed measurements (e.g., LIDAR measurements or the like) or forecasts. The wind turbine blade may be brought to the retracted state, if loads meet (e.g., exceeds) a given load threshold, thereby lowering the loads. The loads may for instance be measured by load sensors, such as strain sensors, on the blade. Similarly, the wind turbine blade may be brought to the retracted state, if measures forces or accelerations, meets (e.g., exceeds) a force or acceleration threshold. These parameters can be measure by for instance accelerometers mounted in the blade.

In the following, there is referred to the rotational speed, but it is recognised that the threshold may be any of the aforementioned thresholds. According to a preferred embodiment, the threshold for an operating wind turbine, is based on the generated power of the wind turbine.

The threshold may have an inherent hysteresis, such that the wind turbine blade does not inadvertently change between the two states, if the wind turbine is operating at conditions close to the threshold.

Further, a difference between the first and second lengths of 1% corresponds to 2% larger rotor diameter, which in turn corresponds to about 2% increase in annual energy production.

Additionally or alternatively, the connection mechanism may be configured to allow a centripetal force when the wind turbine blade operates at a cut-in speed to urge the second blade segment away from the first blade segment thereby bringing the wind turbine blade towards the extended state.

This may be a particularly simple way of ensuring the wind turbine blade is brought in the extended state upon commencing power generation at the cut-in speed.

Additionally or alternatively, the connection mechanism may comprise a biasing element configured for applying a biasing force urging the second blade segment away from the first blade segment so that the wind turbine blade is biased towards the extended state.

This may ensure that the wind turbine blade defaults to the extended state and thus the connection mechanism will only have to switch to the retracted state when the wind turbine blade rotates at the rated speed or design speed of the wind turbine.

Additionally, the biasing element may be configured so that the biasing force of the biasing element overcomes a retracting gravitational force urging the second blade segment towards the first section during a top part of a revolution of the wind turbine blade during operation.

This may ensure that the wind turbine blade does not move between the retracted and extended state during the top part of the wind turbine blade revolution at some wind speeds.

Additionally or alternatively, the connection mechanism may comprise an actuator, e.g. a hydraulic actuator. The actuator may be configured to apply an actuation force in a default state and a release state. The actuator may in the default state be configured to, during rotational operation of the wind turbine blade, apply an actuation force urging the second blade segment towards the first blade segment to bring the wind turbine blade in the retracted state.

Additionally or alternatively, the actuator may in the default state be configured to apply an actuation force overcoming the centripetal force during operation of the wind turbine blade and/or the biasing force of the biasing element to urge the wind turbine blade in the retracted state, and/or a prolonging gravitational force urging the second blade segment away from the first section during a bottom part of a revolution of the wind turbine blade during operation. The actuator may be arranged adjacent to the root of the wind turbine blade.

Additionally or alternatively, the actuator may in the release state be configured to reduce or release the actuation force so that the centripetal force and/or the biasing force overcomes the actuation force to bring the wind turbine blade in the extended state.

Additionally or alternatively, in the retracted state, the first end of the first segment may be positioned in contact with the second end of the second segment. In the extended state, the distance between the first end and the second end may be at least 1% of the first length.

Additionally or alternatively, the connection mechanism may comprise a deployable skin layer. The skin layer may be collapsed in the retracted state. The skin layer may bridge the gap between the first portion of the exterior surface and the second portion of the exterior surface in the extended state.

This may further improve power generation in the extended state as wind energy between blade segments can be captured.

Additionally or alternatively, the connection mechanism may comprise a female section and a male section slidably received by the female section. The female section may be attached to either the first or second blade segments and the male section may be attached to the other one of the first or second blade segments.

Additionally or alternatively, the connection mechanism may be configured to rotate the second blade segment relative to the first blade segment when bringing the wind turbine blade between the retracted and extended states so that, in the retracted state, the second blade segment is oriented at a first pitch angle and so that, in the extended state, the second blade segment is oriented at a second pitch angle in the extended state. The angular difference between the first and second pitch angles is in the range of 1° to 45°, preferably 5° to 40°, more preferably 10° to 30°. Alternatively, the difference between the first and second pitch angle is at least 1°, preferably at least 5°, more preferably at least 10°. Additionally or alternatively, the difference between the first and second pitch angle is at most 40°, 35°, or 30°. The difference between the first and second pitch angle may correspond to feathering of the second blade segment when oriented at the second pitch angle.

This may provide the advantage of increasing the power generation capability of the wind turbine blade in low wind speed environment as the blade can be pitched more aggressively. This may further have the advantage of an improved stall margin and/or reduced noise generation in the extended state of the wind turbine blade.

Additionally or alternatively, the male section may be slidably engaging the female section via a threading with a pitch. The pitch of the threading may be configured to orient the second blade segment at the first pitch angle in the retracted state and to orient the second blade segment at the second pitch angle in the extended state.

This may be a particularly simple arrangement to achieve a pitch angle change between the states.

A second aspect of this disclosure relates to a wind turbine comprising one or more wind turbine blades according to the first aspect. The wind turbine may be configured for operating at a cut-in speed and at a rated speed. The one or more wind turbine blades may be configured so that each wind turbine blade is in the extended state when the wind turbine operates between the cut-in speed and the rated speed. Alternatively, each wind turbine blade may be in the extended state when the wind turbine operates in range between the cut-in speed and the rated speed.

The cut-in speed may correspond to the rotational speed of the wind turbine when in an environment with the lowest possible wind speed for power generation. The rated speed may correspond to the rotational speed of the wind turbine when environment with the highest possible wind speed without any load regulation of the wind turbine blade, e.g. stall or pitch regulation.

Additionally or alternatively, the one or more wind turbine blades may be configured so that each wind turbine blade is in the retracted state when the wind turbine operates at a speed above the rated speed.

Additionally or alternatively, the wind turbine may be configured so that the one or more wind turbine blades switches from the extended state to the retracted state when the rotor rotational speed, ω, reaches a threshold, which may be equal to the rated rotational speed.

Alternatively, the wind turbine may be configured so that the one or more wind turbine blades switches from the extended state to the retracted state when, at a combination of the rotor rotational speed and the incoming wind speed, the following two conditions are met, assuming that in both the retracted and extended states, the wind turbine blade is pitched at the optimal pitch angle and meeting stall margin:

$$Ct_R(V,\omega) \cdot L_R^2 = Ct_E(V,\omega) \cdot R_E^2$$

$$Cp_R(V,\omega) \cdot L_R^2 > Cp_E(V,\omega) \cdot R_E^2$$

wherein Ct is the thrust coefficient (which is a measure for loading), Cp is the power coefficient, V is the incoming wind speed, ω is the rotor rotational speed, L is the blade length, the subscript R denotes the quantity in the retracted state while the subscript E denotes the quantity in the extended state. When these conditions are met, both states result in the same loads but the retracted state results in higher power generation (alternatively, both states yield the same power generation, but the retracted state yields lower loads). The result depends on the characteristics of the wind turbine blade, e.g. airfoil shape, chord and twist distribution, and load limitation.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

FIG. 6b is a schematic end view as seen from the tip of a segmented wind turbine blade comprising the connection mechanism of FIG. 6a.

DETAILED DESCRIPTION OF THE INVENTION

Figure 1:
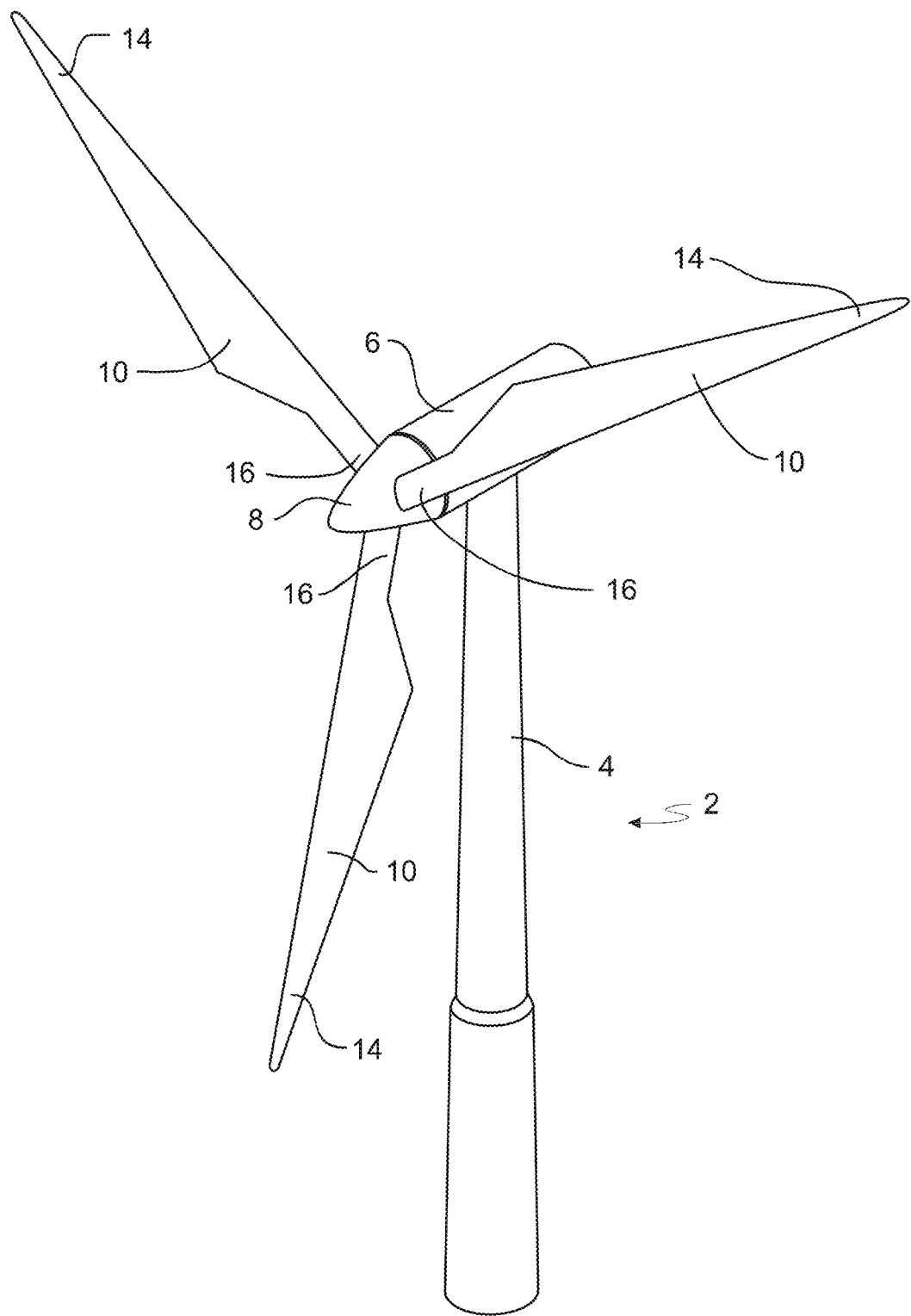
FIG. 1 is a schematic perspective view of a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub 8 and a blade tip 14 farthest from the hub 8.

Figure 2:
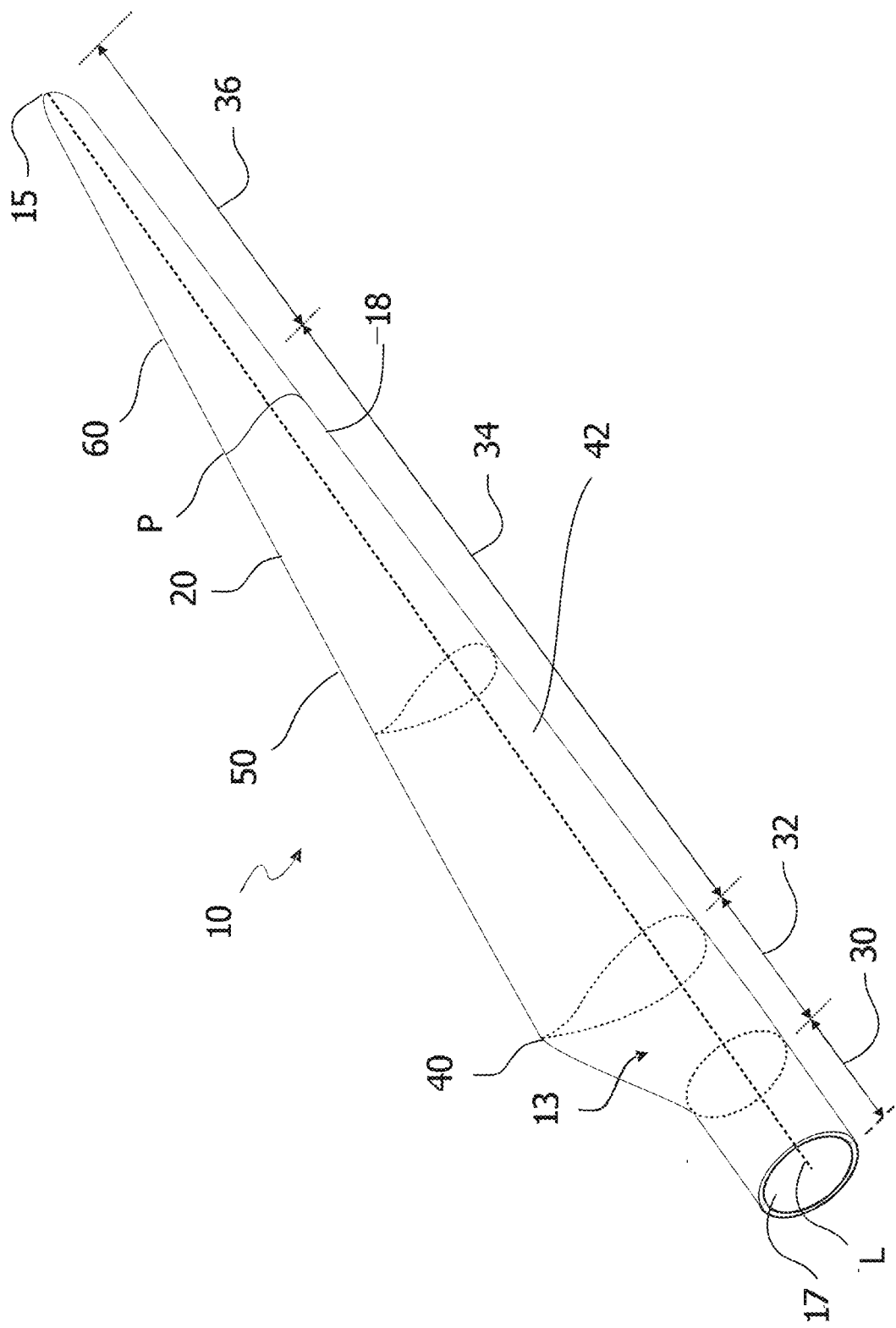
FIG. 2 is a schematic perspective view of a segmented wind turbine blade for a wind turbine as shown in FIG. 1.

FIG. 2 shows a schematic view of a wind turbine blade 10. The wind turbine blade 10 has the shape of a conventional wind turbine blade and comprises an exterior surface 42 having a root region 30 closest to the hub, a profiled or an airfoil region 34 with a tip region 36 farthest away from the hub and a transition region 32 between the root region 30 and the airfoil region 34. The blade 10 comprises a leading edge 18 facing the direction of rotation of the blade 10, when the blade is mounted on the hub 8 of FIG. 1, and a trailing edge 20 facing the opposite direction of the leading edge 18. The outermost radial point of the blade 10 from the hub 8 is the tip end 15.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area. The transition region 32 has a transitional profile gradually changing from the circular or elliptical shape of the root region 30 to the airfoil profile of the airfoil region 34. The chord length of the transition region 32 typically increases with increasing distance from the hub. The airfoil region 34 has an airfoil profile with a chord extending between the leading edge 18 and the trailing edge 20 of the blade 10. The width of the chord decreases with increasing distance from the hub 8.

A shoulder 40 of the blade 10 is defined as the position where the blade 10 has its largest chord length. The shoulder 40 is typically provided at the boundary between the transition region 32 and the airfoil region 34. The outermost third of the airfoil region 34 is typically referred to as the tip region 36. FIG. 2 also illustrates the longitudinal axis L along which the length of the blade is measured.

Figure 3A:
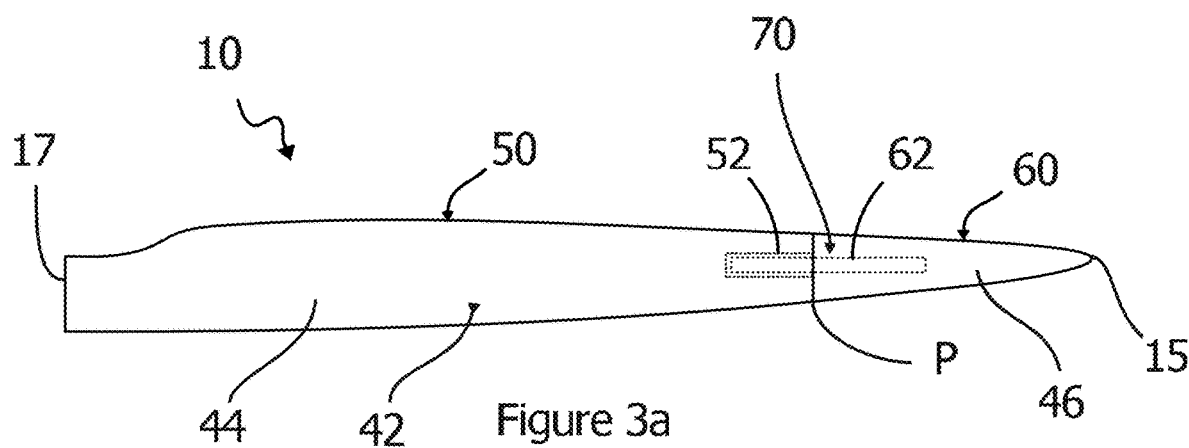
FIG. 3a is a schematic side view of the segmented wind turbine blade.

FIG. 3a schematically illustrates a segmented wind turbine blade 10. It is made up of at least a root segment 50 and a tip segment 60 divided along a partition line P. To allow joining of the root segment 50 with the tip segment 60, the two segments 50, 60 comprise a connection mechanism 70 including a female receiving section 52 and a mating male section 62 inserted into and engaging with the female receiving section 52. The female receiving section 52 and the male section 62 are slidably engaged and locked in connection via the connection mechanism 70. The connection mechanism 70 is shown in greater detail in FIG. 4c. The connection mechanism 70 connects the root blade segment 50 with the tip blade segment 60 in a retracted state and in an extended state. FIG. 3a shows the blade 10 in the retracted state. The retracted and extended states are described in greater detail in connection with FIGS. 5a-5b. It is clear that the male part can alternatively be part of the root segment 50, and the female part can be part of the tip segment 60.

Figure 3B:
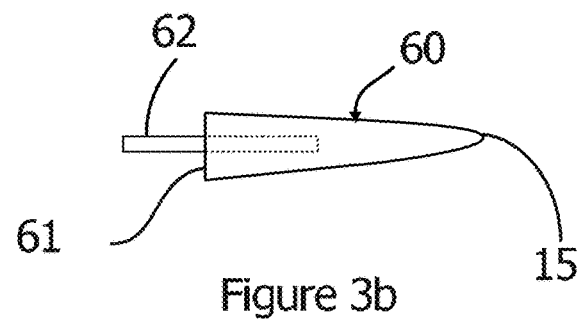
FIG. 3b is a schematic side view of a tip segment of the segmented wind turbine blade.

FIG. 3b illustrates the tip segment 60 of the segmented blade 10 shown in the previous figures. Aside from the shell with a first portion 44 of the exterior surface 42 that forms the aerodynamic profile of the blade 10, the tip segment 60 further comprises the male section 62 as described above. The male section 62 of the tip segment 60 protrudes beyond (outside) the tip segment shell at a second end 61 opposite the tip end 15 to allow the male section to engage with a corresponding female receiving section 52 arranged in the root segment 50. The male section 62 is shown in greater detail in FIG. 4a.

Figure 3C:
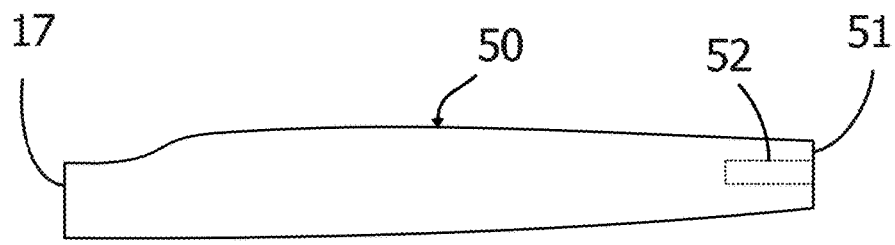
FIG. 3c is a schematic side view of a root segment of the segmented wind turbine blade.

FIG. 3c illustrates the root segment 50 of the segmented blade 10. As described above, the root segment 50 comprises a first end 51 opposite of the root end 17 and further a female receiving section 52 at the first end 51. The female section 52 is configured for receiving the male section 62 of the tip segment 60 to allow the root segment 50 and the tip segment 60 to be securely joined. The final blade 10 is obtained by mating the male section 62 with the female receiving section 52 and locking the connection of the two via the connection mechanism 70. The female section 52 is shown in greater detail in FIG. 4*b*.

Figure 4A:
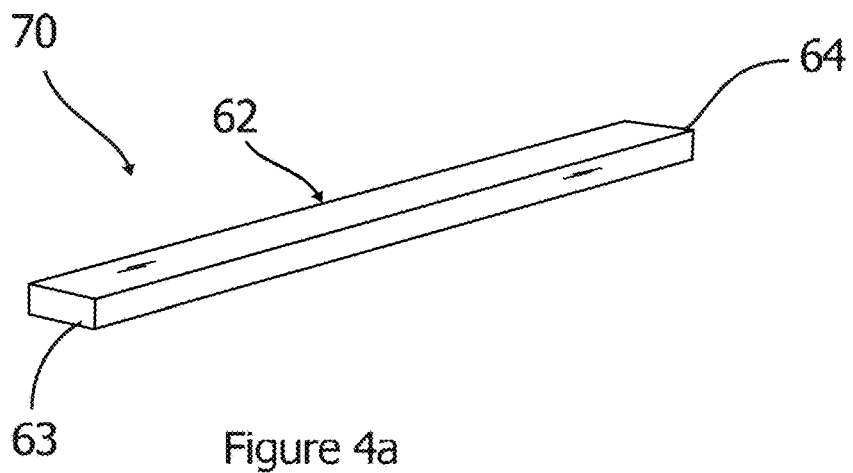
FIG. 4a is a schematic perspective view of a male section of a connection mechanism in the segmented wind turbine blade.

FIG. 4*a* is a schematic illustration of the male section 62 for the connection mechanism 70 of the segmented wind turbine blade 10. The male section has an insertion end 63 for insertion into the female section 62 shown in FIG. 4*b* and a fixed end 64 for being fixed to the second end 61 of the tip segment 60.

Figure 4B:
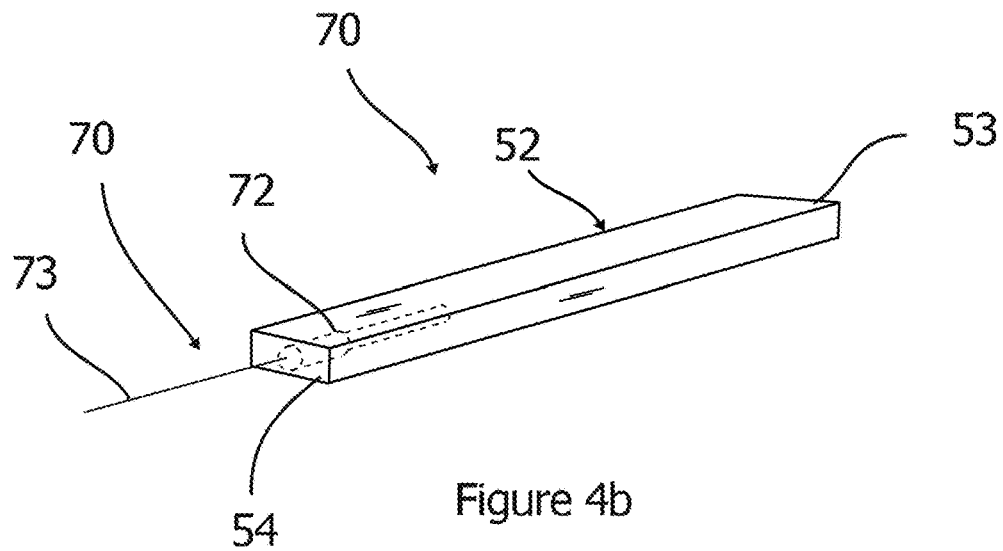
FIG. 4b is a schematic perspective view of a female section for the connection mechanism.

FIG. 4*b* is a schematic illustration of the female receiving section 52 for engaging with the male section 62 shown in FIG. 4*a*. The female receiving section 52 defines an inner cavity and has a longitudinal closed end 54 and an opposite longitudinal open end 53 at the first end 51 of the root blade segment 50. A biasing device 72 in the form of a biased hydraulic piston of the connection mechanism 70 is positioned at the closed end 54. In the shown embodiment, the hydraulic piston is arranged close to the tip.

However, in a preferred embodiment, the hydraulic piston may be arranged close to the root end of the blade, e.g., in combination with a wire used to retract the tip blade segment 60, when the hydraulic pressure is applied. By releasing pressure at the cylinder, the blade tip segment may be pushed out.

Figure 4C:
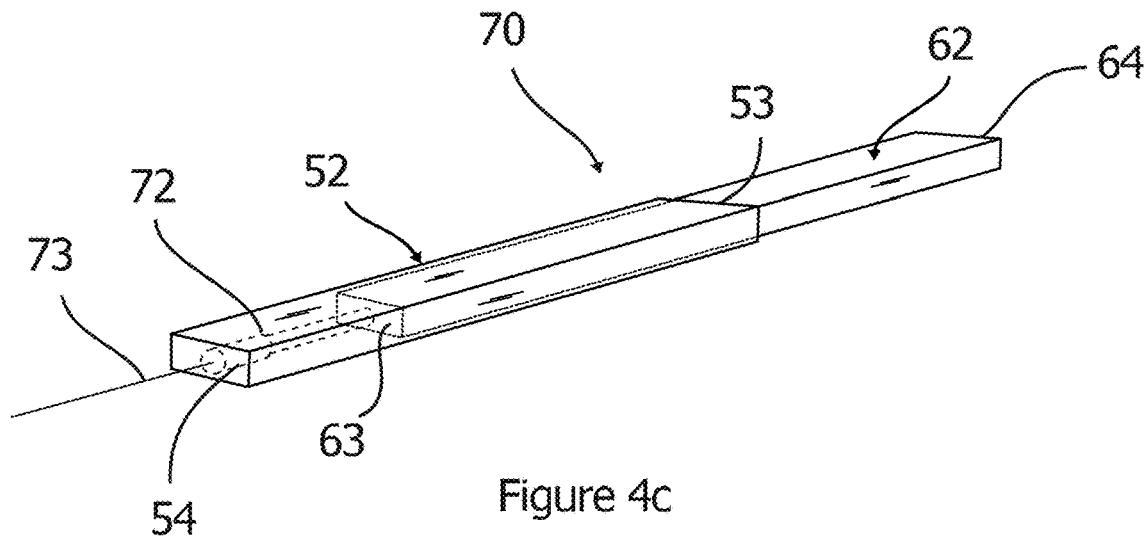
FIG. 4c is a schematic perspective view of the female section mated with the male section of the connection mechanism.

FIG. 4*c* shows the female receiving section 52 and male section 62 slidably engaged with the insertion end 63 of the male section 62 inserted through the longitudinal open end 53 of and into the cavity of the female receiving section 52 to be received therein. The connection mechanism 70 locks the connection between the female section 52 and male section 62 via a stop (not shown) to prevent separation. The biased hydraulic piston 72 engages the male section 62 and comprises a biasing element in the form of a spring (not shown) applying a biasing force on the male section 62 urging it out of the female section 52 thereby urging biasing the blade 10 towards the extended state as shown in FIG. 5*b*. The connection mechanism 70 further comprises a hydraulic line 73 in fluid communication with the hydraulic piston 72 and a hydraulic actuator 71 (shown in FIGS. 5*a*-5*b*). The hydraulics of the connection mechanism 70 are described in greater details in connection with FIGS. 5*a*-5*b*.

Figure 5A:
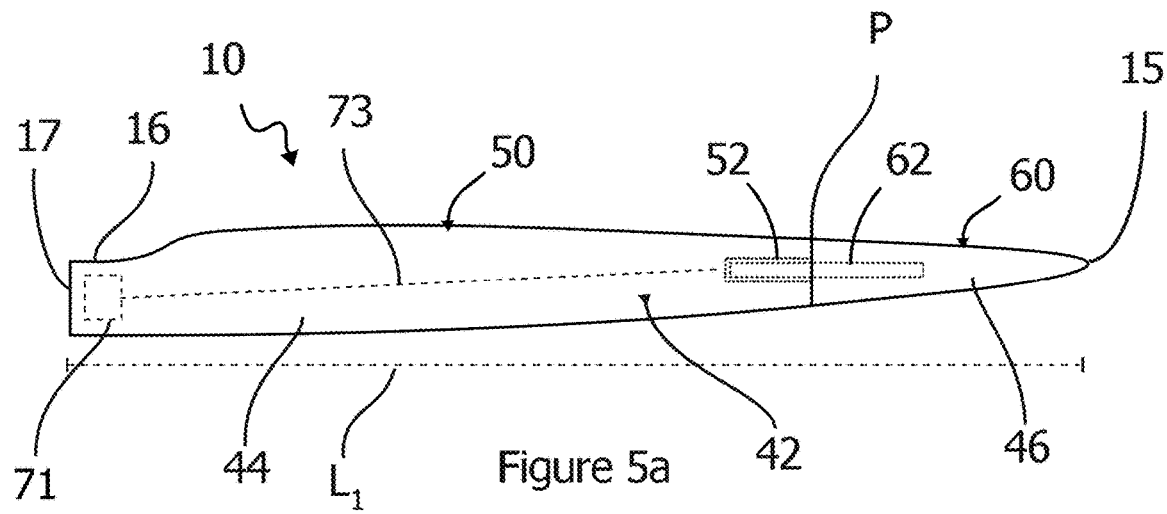
FIG. 5a is a schematic side view of the segmented wind turbine blade in a retracted state.
Figure 5B:
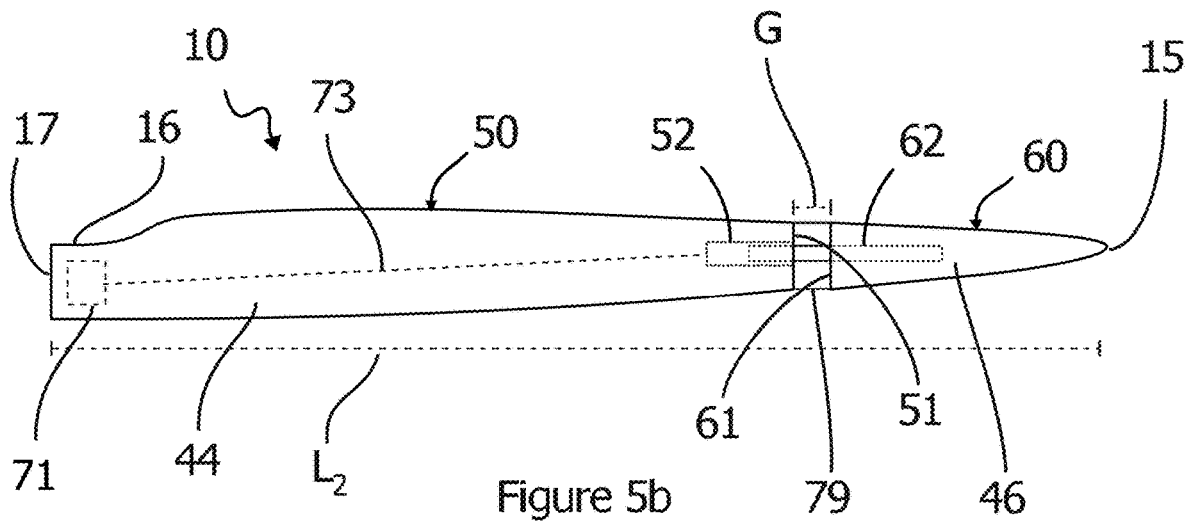
FIG. 5b is a schematic side view of the segmented wind turbine blade in an extended state.

FIG. 5*a* is a schematic illustration of the blade 10 in the retracted state. In this state, the wind turbine blade 10 has a first length $L_1$ from the root end 17 to tip end 15. Further the first portion 44 of the exterior surface 42 of the root segment 50 is arranged substantially flush with and adjoining the second portion 46 of the exterior surface 42 of the tip segment 60 at the partition line P between the blade segments 50, 60. The actuator 71 is set in a default state applying a fluid pressure on the biased hydraulic piston 72 via the hydraulic line 73 causing the piston 72 to retract and apply an actuation force on the male section 62 and thus the tip segment 60. The connection mechanism 70 is configured so that the actuation force overcomes any forces, e.g. centripetal or gravitational forces, along the longitudinal axis L experienced by the tip segment 60 thereby moving towards and retaining the blade 10 in the retracted state as shown. As shown in FIGS. 5*a* and 5*b*, the actuator 71 may be arranged at the root end 17 of the blade and the hydraulic line may extend to the piston 72. However, as mentioned earlier, it is also possible to have all the hydraulics at the root end of the blade. In such an embodiment, a wire can be used to retract the blade tip segment, e.g. when hydraulic pressure is applied, and to release and push the blade tip segment out to the extended state, when the hydraulic pressure is released.

FIG. 5*b* is a schematic illustration of the blade 10 in the extended state. When desiring to switch the blade from the retracted state to the extended state, the connection mechanism 70 sets the actuator 71 to a release state in which the hydraulic actuator 71 releases the hydraulic pressure acting on the biased piston 72 via the hydraulic line 73 thereby reducing the actuation force so that the biasing force of the biasing element overcomes the actuation force and forces the male section 62 outward from the female section 52 to bring the blade 10 in the extended state as shown. In the extended state, the first portion 44 of the exterior surface 42 of the root segment 50 and the second portion 46 of the exterior surface 42 of the tip segment 60 are substantially disconnected by a gap G so that the wind turbine blade is extended and has a second length $L_2$ from the root end 17 to tip end 15 along the longitudinal axis L. The second length $L_2$ is at least 101% of the first length $L_1$. The connection mechanism 70 further comprises a deployable skin layer 79 bridging the gap G between the first end 51 of the root segment 50 and the second end 61 of the tip segment 60 so that the deployable skin layer 79 is arranged substantially flush with the first 44 and second portion 46 of the exterior surface 42 and thereby provides an airfoil extension surface between the root and tip segments 50, 60 to increase power capture.

Figure 6A:
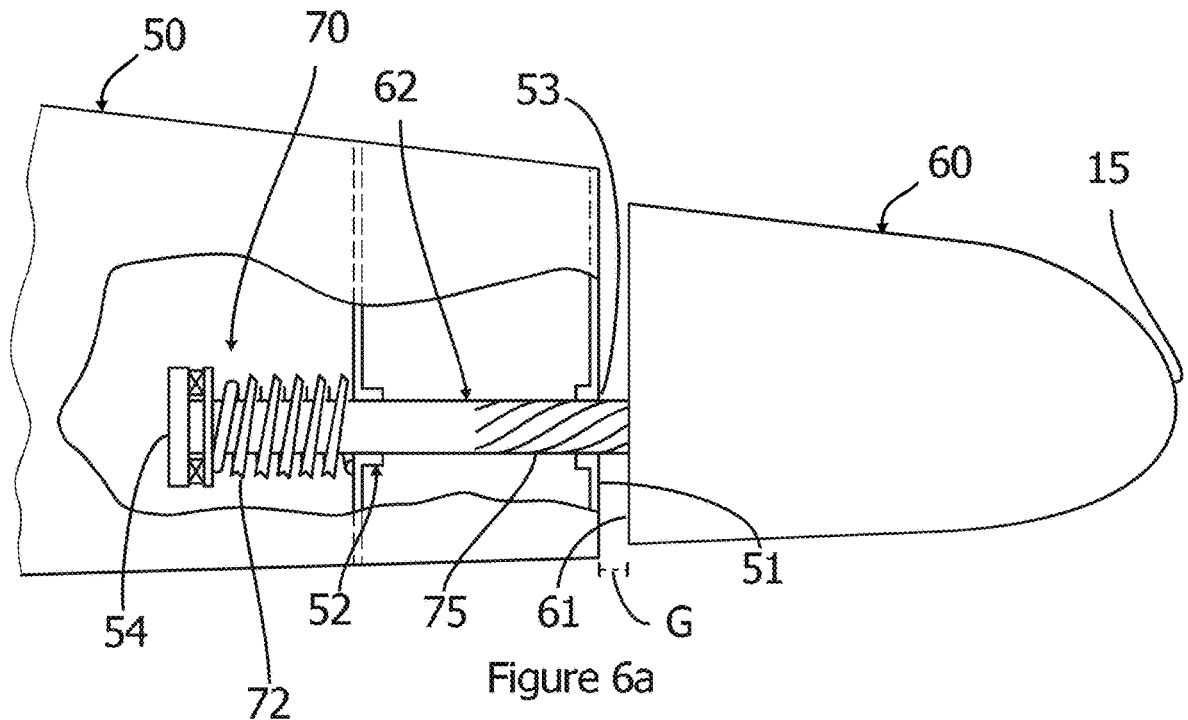
FIG. 6a is a schematic side view of another embodiment of a connection mechanism.
Figure 6B:
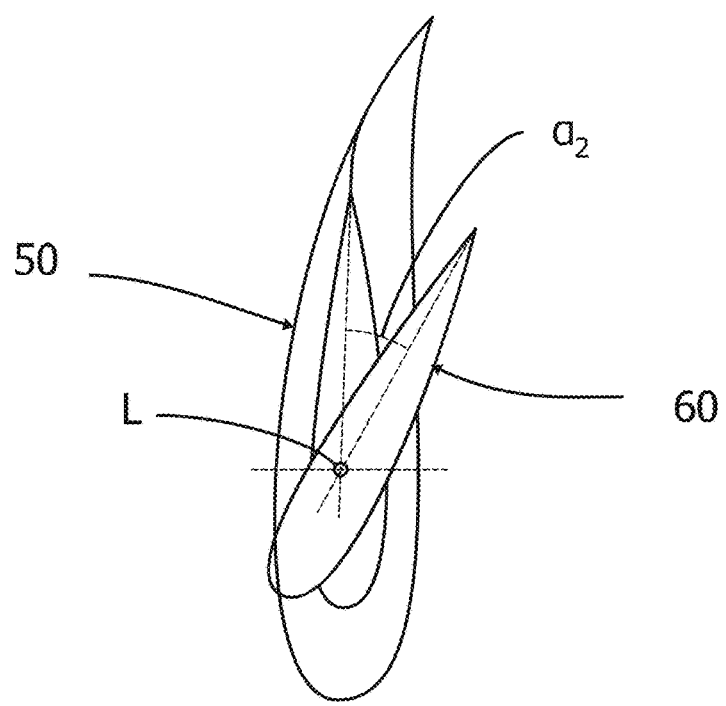

In the previously shown embodiment, the male and female sections 52, 62 of the connection mechanism 70 each has a mating rectangular cross-sectional shape. In another embodiment as shown in FIG. 6*a*-6*b*, the male and female sections 52, 62 of the connection mechanism 70 each has a mating a circular cross-section. Thus, the male section 62, e.g. a shaft such as a carbon shaft or carbon worm shaft, and female section 52 both have a circular cross-sectional shape and slidably engage via a threading 75 with a pitch providing a pre-defined path of the male section 62 relative to the female section 52 between the retracted and extended state. The connection mechanism 70 is thus configured to rotate the tip blade segment 60 relative to the root blade segment 50 when bringing the wind turbine blade 10 between the retracted and extended states so that, in the retracted state, the tip blade segment 60 is oriented at a first pitch angle $\alpha_1$ about the longitudinal axis L and so that, in the extended state, the tip blade segment 60 is oriented at a second pitch angle $\alpha_2$ corresponding to feathering of the tip segment relative to the incoming airflow. The angular difference between the first and second pitch angles is in the range of 1° to 45° as shown in FIG. 6*b* and is chosen according to e.g. the airfoil shape of the wind turbine blade, the chord and twist distribution, and/or the desired load level of the wind turbine blade 10. Further, a biasing device 72 of the connection mechanism 70 in the form of a spring applies a biasing force urging the tip blade segment 60 towards from the root blade segment 50 so that the wind turbine blade 10 is biased towards the retracted state. The connection mechanism 70 further comprises an actuator (not shown), e.g. a hydraulic actuator as previously shown and described, configured for switching between the retracted and extended state. It should be mentioned that the figures are schematic only and that the airfoils typically will have a different camber than the airfoils shown in FIG. 6*b*.

Figure 7A:
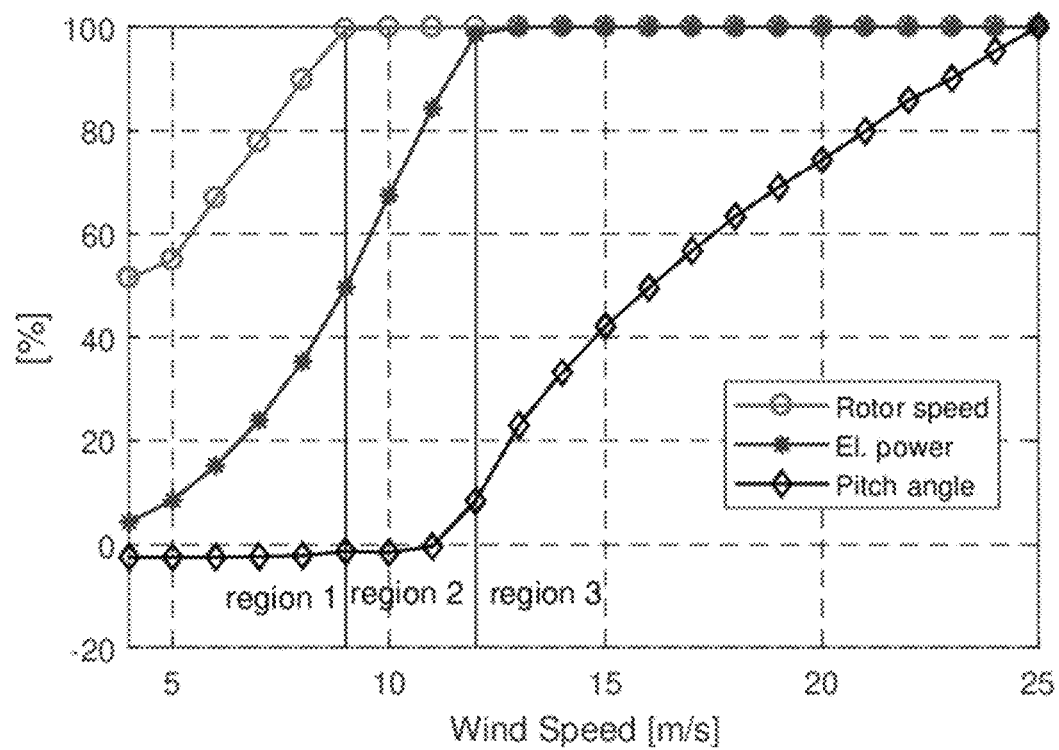
FIG. 7a shows an example illustrating operational parameters.

FIG. 7*a* illustrates an example of the operating parameters of a conventional pitch regulated wind turbine as a function of the wind speed. It is seen that the wind turbine starts to generate power, when the wind speed meets a cut-in speed. At the lower wind speeds, the wind turbine blades are operated at given pitch angle until the rotor speed of the wind turbine meets a design rotor speed. At higher wind speeds, the pitch angle starts to be varied and is continued to be varied at wind speeds, where the nominal (or rated) power of the wind turbine is met.

Figure 7B:
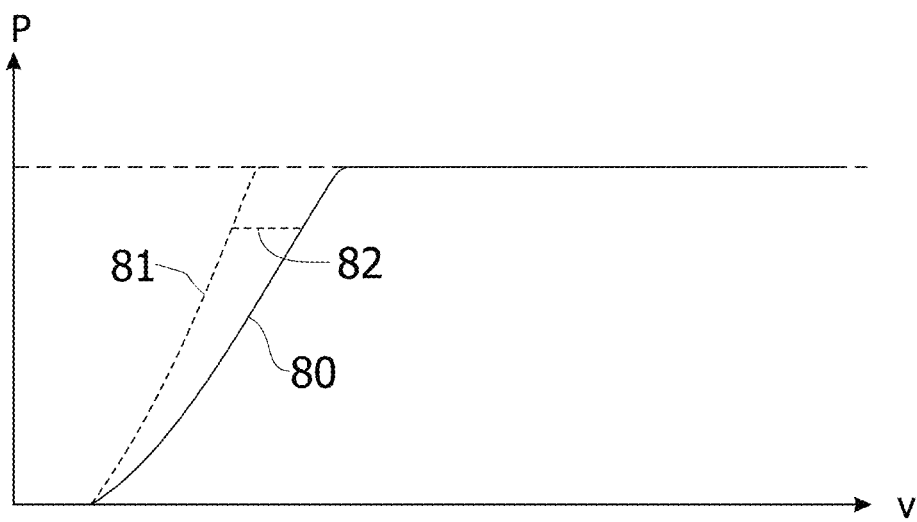
FIG. 7b illustrates how annual energy production can be increased by using the segmented wind turbine blade.

FIG. 7b illustrates the benefits of using the described segmented blades. Curve 80 illustrates a relationship between the output power from the wind turbine as a function of the wind speed, when the wind turbine blades are in a retracted state, whereas curve 81 illustrates the relationship between the output power from the wind turbine as a function of the wind speed, when the wind turbine blades are in the extended state. It is seen that the coefficient is larger, when the wind turbine blades are in an extended state, which means that additional power can be generated, when the wind speeds are in a region between the cut-in speed and the wind speed, where the nominal or rated power of the wind turbine is met. Thus, the annual energy production (AEP) can be increased by operating the wind turbine blades in the extended state, e.g., when an operational parameter is below a predetermined threshold. As mentioned earlier, the threshold can be based on a number of parameters, such as generated power, rotor speed, wind speed, loads, noise or the like. Curve 82 illustrates an example of a threshold level, where the operational conditions of the wind turbine blades change from the extended state to the retracted state. As also mentioned, the threshold can have an inherent hysteresis to ensure that the wind turbine blades do not inadvertently toggle between the two states at conditions close to the threshold.

| List of References | |
|---|---|
| 2 | wind turbine |
| 4 | tower |
| 6 | nacelle |
| 8 | hub |
| 10 | blade |
| 13 | shell |
| 14 | blade tip |
| 15 | tip end |
| 16 | blade root |
| 17 | root end |
| 18 | leading edge |
| 20 | trailing edge |
| 30 | root region |
| 32 | transition region |
| 34 | airfoil region |
| 36 | tip region |
| 40 | shoulder |
| 42 | exterior surface |
| 44 | first portion |
| 46 | second portion |
| 50 | root blade segment |
| 51 | first end |
| 52 | female section |
| 53 | receiving open end |
| 54 | closed end |
| 60 | tip blade segment |
| 61 | second end |
| 62 | male section |
| 63 | insertion end |
| 64 | fixed end |
| 70 | connection mechanism |
| 71 | hydraulic actuator |
| 72 | biasing device |
| 73 | hydraulic line |
| 75 | threading |
| 79 | skin layer |

-continued

| List of References | |
|---|---|
| 80 | P-v curve at retracted state |
| 81 | P-v curve at extended state |
| 82 | change from extended to retracted state |
| L | longitudinal axis |
| $L_1$ | first length |
| $L_2$ | second length |
| P | partition line |
| G | gap |
| α | pitch angle |

The invention claimed is:

1. An extendable wind turbine blade, comprising:
a root end and a tip end, the wind turbine blade extendable along a longitudinal axis running between the root end and the tip end;
an exterior surface with a root region and an airfoil region;
a leading edge and a trailing edge, and a chord line extending between the leading edge and trailing edge;
a first blade segment including a first portion of the exterior surface and a first end;
a second blade segment including a second portion of the exterior surface and a second end, the second blade segment being separate from the first blade segment, the first end and the second end being opposite and facing each other;
a connection device engaged between the first blade segment and the second blade segment, the connection device having a first length when the second blade segment is in a retracted state when the wind turbine blade operates above a threshold;
the connection device having a second length when the second blade segment is in an extended state when the wind turbine blade operates below the threshold;
wherein, in the retracted state, the wind turbine blade has a first length from the root end to tip end and the first portion of the exterior surface is arranged flush with and adjoining the second portion of the exterior surface;
wherein, in the extended state, the wind turbine blade has a second length from the root end to tip end and the second blade segment is arranged with a gap to the first blade segment so that the first portion of the exterior surface and the second portion of the exterior surface are disconnected;
wherein the second length is greater than the first length; and
the connection device configured to allow a centrifugal force generated at a cut-in speed of the wind turbine blade to move the second blade segment away from the first blade segment thereby bringing the wind turbine blade to the extended state.

2. The wind turbine blade according to claim 1, wherein the connection device is configured to rotate the second blade segment relative to the first blade segment when bringing the wind turbine blade between the retracted and extended states so that, in the retracted state, the second blade segment is oriented at a first pitch angle and, in the extended state, the second blade segment is oriented at a second pitch angle, wherein a difference between the first and second pitch angles is in the range of 1° to 45°.

3. The wind turbine blade according to claim 2, wherein the connection device comprises:

a female section;

a male section slidably received by the female section, wherein the female section is attached to either the first or second blade segment and the male section is attached to the other one of the first or second blade segment; and the male section slidably engaging the female section via a threading with a pitch configured to orient the second blade segment at the first pitch angle in the retracted state and to orient the second blade segment at the second pitch angle in the extended state.

4. An extendable wind turbine blade, comprising:

a root end and a tip end, the wind turbine blade extendable along a longitudinal axis running between the root end and the tip end;

an exterior surface with a root region and an airfoil region;

a leading edge and a trailing edge, and a chord line extending between the leading edge and trailing edge;

a first blade segment including a first portion of the exterior surface and a first end;

a second blade segment including a second portion of the exterior surface and a second end, the second blade segment being separate from the first blade segment, the first end and the second end being opposite and facing each other;

a connection device engaged between the first blade segment and the second blade segment, the connection device having a first length when the second blade segment is in a retracted state when the wind turbine blade operates above a threshold;

the connection device having a second length when the second blade segment is in an extended state when the wind turbine blade operates below the threshold;

wherein, in the retracted state, the wind turbine blade has a first length from the root end to tip end and the first portion of the exterior surface is arranged flush with and adjoining the second portion of the exterior surface;

wherein, in the extended state, the wind turbine blade has a second length from the root end to tip end and the second blade segment is arranged with a gap to the first blade segment so that the first portion of the exterior surface and the second portion of the exterior surface are disconnected;

wherein the second length is greater than the first length; and wherein the connection device comprise a biasing element configured to apply a biasing force that urges the second blade segment away from the first blade segment so that the wind turbine blade is biased towards the extended state.

5. The wind turbine blade according to claim 4, wherein the threshold is based on one or more of: a rotational speed threshold, a power threshold, a wind speed threshold, a load threshold, a noise threshold, and a force or acceleration threshold.

6. A wind turbine blade according to claim 4, wherein the biasing element is configured so that the biasing force of the biasing element overcomes a retracting gravitational force urging the second blade segment towards the first section during a top part of a revolution of the wind turbine blade during operation.

7. The wind turbine blade according to claim 4, wherein the connection device comprises an actuator configured to apply an actuation force in a default state and a release state, wherein in the default state the actuator applies an actuation force that urges the second blade segment towards the first blade segment to bring the wind turbine blade to the retracted state.

8. The wind turbine blade according to claim 7, wherein in the release state, the actuator is configured to reduce the actuation force so that the biasing force from the biasing element overcomes the actuation force to bring the wind turbine blade to the extended state.

9. The wind turbine blade according to claim 4, wherein the connection device is configured to rotate the second blade segment relative to the first blade segment when bringing the wind turbine blade between the retracted and extended states so that, in the retracted state, the second blade segment is oriented at a first pitch angle and, in the extended state, the second blade segment is oriented at a second pitch angle, wherein a difference between the first and second pitch angles is in the range of 1° to 45°.

10. The wind turbine blade according to claim 9, wherein the connection device comprises:

a female section;

a male section slidably received by the female section, wherein the female section is attached to either the first or second blade segment and the male section is attached to the other one of the first or second blade segment; and the male section slidably engaging the female section via a threading with a pitch configured to orient the second blade segment at the first pitch angle in the retracted state and to orient the second blade segment at the second pitch angle in the extended state.

11. An extendable wind turbine blade, comprising:

a root end and a tip end, the wind turbine blade extendable along a longitudinal axis running between the root end and the tip end;

an exterior surface with a root region and an airfoil region;

a leading edge and a trailing edge, and a chord line extending between the leading edge and trailing edge;

a first blade segment including a first portion of the exterior surface and a first end;

a second blade segment including a second portion of the exterior surface and a second end, the second blade segment being separate from the first blade segment, the first end and the second end being opposite and facing each other;

a connection device engaged between the first blade segment and the second blade segment, the connection device having a first length when the second blade segment is in a retracted state when the wind turbine blade operates above a threshold;

the connection device having a second length when the second blade segment is in an extended state when the wind turbine blade operates below the threshold;

wherein, in the retracted state, the wind turbine blade has a first length from the root end to tip end and the first portion of the exterior surface is arranged flush with and adjoining the second portion of the exterior surface;

wherein, in the extended state, the wind turbine blade has a second length from the root end to tip end and the second blade segment is arranged with a gap to the first blade segment so that the first portion of the exterior surface and the second portion of the exterior surface are disconnected;

wherein the second length is greater than the first length; and wherein the connection mechanism comprises an actuator configured to apply an actuation force in a default state and a release state, wherein in the default state the actuator applies an actuation force that urges the second blade segment towards the first blade segment to bring the wind turbine blade to the retracted state, wherein in the release state, the actuator is configured to reduce the actuation force so that a centrifugal force overcomes the actuation force to bring the wind turbine blade to the extended state.

12. The wind turbine blade according to claim 11, wherein the threshold is based on one or more of: a rotational speed threshold, a power threshold, a wind speed threshold, a load threshold, a noise threshold, and a force or acceleration threshold.

13. The wind turbine blade according to claim 11, wherein the connection device is configured to rotate the second blade segment relative to the first blade segment when bringing the wind turbine blade between the retracted and extended states so that, in the retracted state, the second blade segment is oriented at a first pitch angle and, in the extended state, the second blade segment is oriented at a second pitch angle, wherein a difference between the first and second pitch angles is in the range of 1° to 45°.

14. The wind turbine blade according to claim 13, wherein the connection device comprises:
- a female section;
- a male section slidably received by the female section, wherein the female section is attached to either the first or second blade segment and the male section is attached to the other one of the first or second blade segment; and
- the male section slidably engaging the female section via a threading with a pitch configured to orient the second blade segment at the first pitch angle in the retracted state and to orient the second blade segment at the second pitch angle in the extended state.

* * * * *